No. 651,417. Patented June 12, 1900.
N. H. FAY.
FEED MOTION FOR LATHES.
(Application filed Dec. 7, 1899.)
(No Model.)
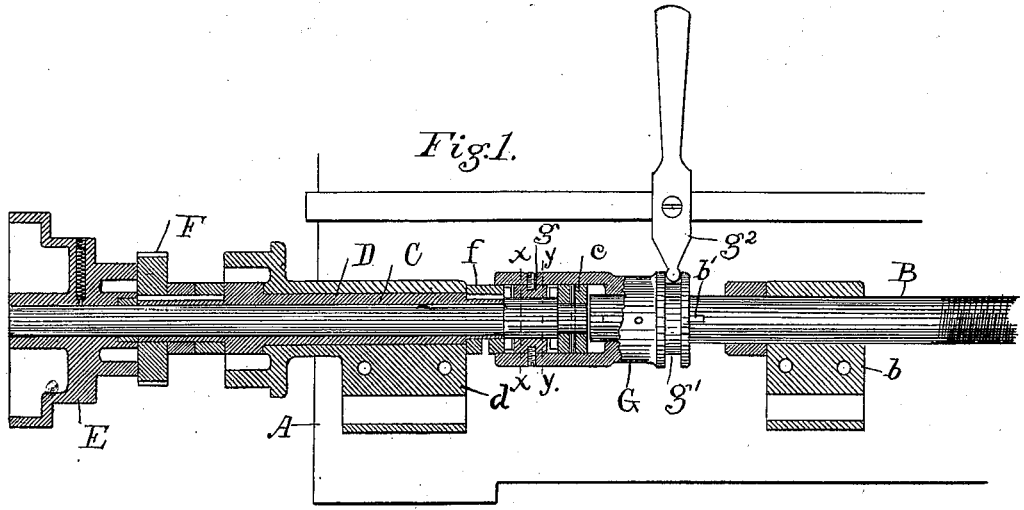
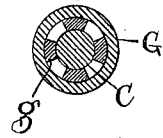
Witnesses:
Frank H. Colley.
L. M. Godfrey.
Inventor:
Norman H. Fay
by Jno. Bates
Atty.

UNITED STATES PATENT OFFICE.

NORMAN H. FAY, OF DEXTER, MAINE.

FEED-MOTION FOR LATHES.

SPECIFICATION forming part of Letters Patent No. 651,417, dated June 12, 1900.

Application filed December 7, 1899. Serial No. 739,468. (No model.)

*To all whom it may concern:*

Be it known that I, NORMAN H. FAY, a citizen of the United States of America, and a resident of Dexter, county of Penobscot, State of Maine, have invented certain new and useful Improvements in Feed-Motions for Lathes, of which the following is a specification.

My invention relates to feed-motions for engine-lathes; and the object of the invention is to provide mechanism by which a single driving-screw will be enabled to do the work of a lead-screw and feed-rod by being shifted quickly from a slow speed, adapted to screw-cutting, &c., to a higher speed, adapted to general work.

The invention consists, essentially, of two shafts, one journaled within the other and each being driven at a different rate of speed and each having on its inner end a clutch adapted to engage in turn an intermediate clutch, which is secured at one end of a sleeve, the other end of the sleeve being connected with the feeding-screw. By bringing one or the other clutch into engagement with the intermediate clutch the motions of one or the other of the shafts is conveyed to the feeding-screw.

I illustrate my invention by means of the accompanying drawings, in which—

Figure 1 is a general longitudinal section, some of the parts being shown in elevation; and Fig. 2 is a section on $x\,x$ and $y\,y$ of Fig. 1.

A represents the frame of the lathe looking from the front side.

B is the feeding-screw, which feeds the slide, the latter not being shown, and $b$ is one of the bearings. Beyond the end of the feeding-screw and in line therewith are two shafts, an exterior hollow shaft D and an interior shaft C, journaled therein, terminating adjacent to the end of the feeding-screw. The exterior shaft D is journaled in a suitable bearing $d$ near the end of the lathe. These shafts are provided with means for rotating them at a different rate of speed. As here shown, the interior shaft C has on its outer end a cone-pulley E, while the shaft D is provided with a gear F between the cone-pulley and the end of the lathe. It will be understood that the cone-pulley and the interior shaft are driven in the usual manner at speeds adapted to general work, while the gear and the exterior shaft are driven at speeds adapted to screw-cutting.

On the inner end of the shaft D is a clutch $f$ and on the inner end of the shaft C is a clutch $c$. These two clutches are far enough apart to permit an intermediate clutch $g$ to be located between them and so that it will not engage either of them when it is in its central position. The clutch $g$ is loosely mounted on the shaft C, so as to slide longitudinally thereon, and it is provided on each side with indented faces which engage like faces on the clutches $f$ and $c$. The motion of the clutches $f$ and $c$ and of their respective shafts is conveyed to the feeding-screw by means of a sleeve G, to the interior of which the clutch $g$ is secured at one end, the opposite end being connected with the end of the feeding-screw by means of a spline $b'$ or other equivalent connection, which allows the sleeve to be moved longitudinally on the shaft while rotating therewith. The sleeve is provided with an annular groove $g'$, which is engaged by the end of a shipping-lever $g^2$, pivoted to the frame of the lathe, or the sleeve may be moved by any other suitable device.

From the above description it will be seen that by throwing the lever $g^2$ one way or the other the motion of one or the other of the shafts C or D may be transferred to the feeding-screw B, both of said shafts being always in motion.

The advantage of this construction will be obvious to persons operating lathes. When the latter is to be used for screw-cutting, the lever $g^2$ is simply thrown over to the right, and when it is to be used for general work it is thrown to the left.

The mechanism is simple, compact, and easily manipulated, and it enables a single feeding-screw to do the work of a lead-screw and feed-rod without changing belt or gears at head of lathe.

I claim—

In a feed-motion for lathes, the combination of a hollow exterior shaft, an interior shaft journaled therein, means for driving said shafts at unequal speeds, a clutch on the inner end of each shaft, an intermediate clutch mounted on said inner shaft between said clutches and adapted to engage with either, a sleeve rigidly secured by one end to
5 said intermediate clutch and by the other end to the feeding-screw with a spline connection and extending over and inclosing the clutch on the end of the interior shaft and means for sliding said sleeve longitudinally, substantially as shown.

NORMAN H. FAY.

Witnesses:
F. D. DEARTH,
J. W. HAINES.